(12) United States Patent
Absillis et al.

(10) Patent No.: US 9,118,433 B2
(45) Date of Patent: Aug. 25, 2015

(54) GPON OAM USING IEEE 802.1AG METHODOLOGY

(75) Inventors: Luc Absillis, Raleigh, NC (US); Sudheer Dharanikota, Cary, NC (US); Gopal Surya, Raleigh, NC (US)

(73) Assignee: Alcatel Lucent, Boulogne-Billancourt (FR)

( * ) Notice: Subject to any disclaimer, the term of this patent is extended or adjusted under 35 U.S.C. 154(b) by 396 days.

(21) Appl. No.: 11/745,001

(22) Filed: May 7, 2007

(65) Prior Publication Data

US 2008/0279105 A1    Nov. 13, 2008

(51) Int. Cl.
*H04L 12/26* (2006.01)
*H04J 3/14* (2006.01)
*H04L 12/66* (2006.01)
*H04L 12/24* (2006.01)
*H04Q 11/00* (2006.01)
*H04J 3/16* (2006.01)

(52) U.S. Cl.
CPC ............... *H04J 3/14* (2013.01); *H04L 12/2697* (2013.01); *H04L 12/66* (2013.01); *H04L 41/06* (2013.01); *H04L 43/50* (2013.01); *H04Q 11/0067* (2013.01); *H04J 3/1694* (2013.01); *H04Q 2011/0081* (2013.01)

(58) Field of Classification Search
CPC .................... H04Q 11/0067; H04Q 201/0081; H04Q 201/0083
USPC ...................................... 370/241, 241.1, 236.2
See application file for complete search history.

(56) References Cited

U.S. PATENT DOCUMENTS

| | | | |
|---|---|---|---|
| 7,230,926 B2* | 6/2007 | Sutherland et al. | 370/241 |
| 2005/0094567 A1* | 5/2005 | Kannan et al. | 370/241 |
| 2005/0198272 A1* | 9/2005 | Bernard et al. | 709/224 |
| 2008/0219172 A1* | 9/2008 | Mohan et al. | 370/241.1 |

FOREIGN PATENT DOCUMENTS

| | | |
|---|---|---|
| JP | 2006-352327 | 12/2006 |
| WO | 2006/076493 A | 7/2006 |

OTHER PUBLICATIONS

Sridhar et al. Alcatel, End-To-End Ethernet Connectivity Fault Management in Metro and Access Networks, Technology White Paper, 2005, 14, Ed. 01, Alcatel.*
Alcatel, End-To-End Ethernet Connectivity Fault Management in Metro and Access Networks, Technology White Paper, 2005, 14, Ed. 01, Alcatel.*

(Continued)

*Primary Examiner* — Mark Rinehart
*Assistant Examiner* — Matthew Hopkins
(74) *Attorney, Agent, or Firm* — Capitol Patent & Trademark Law Firm, PLLC

(57) ABSTRACT

Operations, administration and management (OAM) functions in a passive optical network (PON) can be performed by providing a system of flow points (i.e., software entities), such as those along the lines of the Maintenance End Points (MEPs) and Maintenance Intermediate Points (MIPs) described in the IEEE 802.1ag specification, which communicate connectivity fault test messages with each other. The flow points can be provided in the Optical Line Terminal (OLT) and Optical Network Terminator (ONT). Alternatively or in addition, flow points can be provided in a subscriber gateway coupled to the ONT. The flow points issue test messages, to which other flow points can respond with information regarding the state of network connectivity.

6 Claims, 7 Drawing Sheets

(56) References Cited

OTHER PUBLICATIONS

IEEE P802.1ag/D5.2 Virtual Bridged Local Area Networks—Amendment 5: Connectivity Fault Management, 137 pages, Dec. 6, 2005.

Sweden Telecom AB: "FTTx GPON System", 2007, pp. 1-4, XP002486974.

OFCNFOEC 2006, 2006 Optical Fiber Communication Conference and National Fiber Optic Engineers Conference, Mar. 5-10, 2006, Anaheim, CA, p. 10, XP002486975.

Dinesh, M., :802.1AG Connectivity Fault Management Tutorial, XP002346928.

The Metro Ethernet Forum, "Service OAM Requirements & Framework—Phase 1", Technical Specification MEF 17, Apr. 2007, pp. 1-18, XP002486976.

Lorentzen, Julie D. et al., "Draft New Recommendation G.984.4 (ex-G.984.omci) (for consent)", ITU-T Draft Study Period 2001-2004, International Telecommunication Union, Geneva, CH, vol. Study Group 15, Feb. 1, 2004, pp. 1-113, XP017413458.

Search Report dated Jul. 30, 2008, issued in International Application PCT/US2008/062316.

* cited by examiner

GPON OAM USING IEEE 802.1AG METHODOLOGY

BACKGROUND OF THE INVENTION

1. Field of the Invention

The present invention relates generally to passive optical networks (PONs) and, more specifically, to OAM features in PON technology.

2. Description of the Related Art

OAM, which stands for "operations, administration and management," is a term commonly used to describe the instrumentation of telecommunications networks with tools to allow network operators to remotely install, monitor and troubleshoot elements of their networks. Early network management methodologies generally involved the exchange of messages directly between a central network management platform (e.g., a network server) and each of the other network nodes, so that each node could be monitored and controlled from the central network management system. With Ethernet developing into the dominant network technology for delivering broadband services, such as Internet access, digital telephony and television, a need became apparent for a methodology to aid network service providers in verifying end-to-end connectivity of Ethernet-based network service to their subscribers. Such a methodology has been referred to in the art as Connectivity Fault Management (CFM). Accordingly, an Ethernet OAM standard for CFM, known as IEEE 802.1ag, has been developed. End-to-end CFM refers to the ability of a network to monitor the "health" of a service delivered to end-users, as opposed to just links or individual bridges. Ethernet OAM has been used in networks that deliver services to subscribers via digital subscriber lines (DSL) and similar wire-based broadband connections.

The IEEE 802.1ag standard defines a "Maintenance Entity" domain hierarchy, with a customer-level domain at the highest level of the hierarchy, and one or more provider domains at intermediate levels, each of which in turn includes one or more operator domains disposed at a lower hierarchical level. A Maintenance Entity domain level is defined in terms of what are referred to as flow points. In the context of the IEEE 802.1ag specification, the flow points are (typically, software) entities that operate in the Media Access Control (MAC) "interfaces" and "ports" of switches, routers and other Ethernet devices. A port can implement multiple flow points of different types. A flow point at the edge of an OAM domain is called a "Maintenance End Point" or MEP. MEPs can, among other functions, initiate test messages. A flow point inside an OAM domain and visible to an MEP is called a "Maintenance Intermediate Point" or MIP. Whereas MEPs initiate test messages, either on an automatic basis or at the request of system administrators, MIPs passively receive and respond to OAM flows initiated by MEPs. The messages initiated by MEPs on a Maintenance Entity level are generally confined to that level and invisible to MEPs and MIPs on other levels.

Most Ethernet-based service provider networks comprise active components, such as switchers, routers, and other such devices that consume power, in the path between a central office (or exchange, as it is sometimes referred to) and a subscriber. In addition to requiring power, active components are subject to failure and performance degradation over time, and may require significant periodic maintenance. The passive optical network (PON) has been developed to overcome some of these deficiencies. The essence of a PON is that nothing but optical fiber and passive components are found in the path between the central office and subscribers. A single fiber can run from the central office to a passive splitter located near a group of subscribers, such as a neighborhood or office complex, and individual fibers can run from the splitter to individual subscribers or sub-groups of subscribers.

The International Telecommunications Union (ITU) and the Institute of Electrical and Electronics Engineers (IEEE) are two standards-making bodies currently developing PON standards. The ITU has adopted recommendations of the Full Service Access Networks (FSAN) organization, including G983.x, a specification sometimes referred to as "broadband PON" (BPON), and G984.x, a specification sometimes referred to as "gigabit PON" (GPON). The IEEE has also adopted Ethernet-based (i.e., IEEE 802.3-based) PON standards referred to as "Ethernet PON" (EPON) and "gigabit EPON" (GEPON). These standards and recommendations are well known to persons skilled in the art to which the invention relates and are therefore not described in further detail in this patent specification. Although the term GPON may be used herein for convenience with regard to embodiments of the present invention described below, the invention can be applied to any suitable PON technology.

In accordance with these standards, a PON comprises an optical line terminal (OLT) (also known as optical line terminator), which is typically located at the central office, and a number of optical network terminators (ONTs) (also known as optical network terminals and optical network units), each located at the subscriber's premises (e.g., home, office building, etc.), with optical fiber and one or more splitters between the OLT and ONTs. In the downstream direction, i.e., data transmitted from the OLT (e.g., located at the central office) to an ONT (e.g., located at a subscriber's premises), the data units are broadcast from the OLT to all of the ONTs on the PON, and an ONT can select the data to receive by matching the address embedded in the data units to a previously provisioned or learned address. In other words, an ONT only "listens" to data units having a matching address. Thus, the OLT can transmit data "downstream" to a particular or selected ONT by addressing it to that ONT. In the "upstream" direction, i.e., data transmitted from an ONT to the OLT, the data units are time-domain multiplexed. In GPON, the downstream address typically comprises both a conventional Ethernet MAC address as well as a GPON Encapsulation Method (GEM) Port-ID. The GEM Port-ID can be used as a Quality-of-Service (QoS) designator to address a priority queue on a particular port on a subscriber ONT, a queue for high speed internet traffic, a queue for packet telephony, a queue for video traffic, etc. Quality of Service (QoS) is a term that refers to assigning data packets different priorities based upon the type of data. For example, real-time streaming video (i.e., digital television) service is generally assigned a higher priority than Internet Web browsing and e-mail. In this manner, demands placed upon the network by multiple subscribers simultaneously requesting different services are less likely to diminish any subscriber's perception of service quality. QoS differentiation is an important aspect of GPON systems.

Conventional OAM tools focus on individual network segments and are not well adapted for a view across an entire PON architecture. Conventional OAM tools are likewise not well adapted for correlating errors from individual PON segments. Furthermore, conventional OAM tools do not address the QoS features that are characteristic of PONs. It would be desirable to provide a method and apparatus that provides end-to-end OAM capability, such as that of the IEEE 802.1ag methodology, in a PON. The present invention addresses these problems and deficiencies and others in the manner described below.

SUMMARY OF THE INVENTION

The present invention relates generally to operations, administration and management (OAM) in passive optical networks (PONs) and, more specifically, to OAM connectivity fault management (CFM) using a system of flow points (i.e., software entities operating in conjunction with the processor systems of network elements), such as those along the lines of the Maintenance End Points (MEPs) and Maintenance Intermediate Points (MIPs) described in the IEEE 801.1ag specification, which communicate connectivity fault test messages with each other. As a conventional PON comprises an Optical Line Terminal (OLT) coupled via a passive fiber network to a network device system that includes an Optical Network Terminator (ONT), the flow points can be provided in the OLT and ONT. Alternatively or in addition, as a conventional PON can comprise not only an OLT and ONT but also a subscriber gateway connected to the ONT, flow points can be provided in the OLT and the gateway or, alternatively, in the OLT, the ONT, and the gateway.

In a manner analogous to that described in the IEEE 801.1ag specification, the MEPs can issue connectivity fault test messages to which other MEPs on the same Maintenance Entity (ME) level can respond and, conversely, can respond to connectivity fault test messages issued by MEPs on the same ME level. Likewise, the MIPs can respond to connectivity fault test messages issued by MEPs on the same ME level. The responses indicate whether proper network connectivity exists. The MEPs can operate in response to any suitable conditions along the lines of those specified in IEEE 802.1ag. For example, they can operate autonomously, such as by issuing messages at timed intervals. Alternatively, for example, they can operate under the control of a user (system operator) via a suitable management platform coupled to the network. In still other embodiments of the invention the MEPs can operate in a combination of both autonomous and user-controlled modes. The MEP and MIP responses can be gathered and used to provide status reports to system operators to notify of connectivity faults or similar undesirable states in the PON so that system operators can take appropriate action.

DETAILED DESCRIPTION

Figure 1:
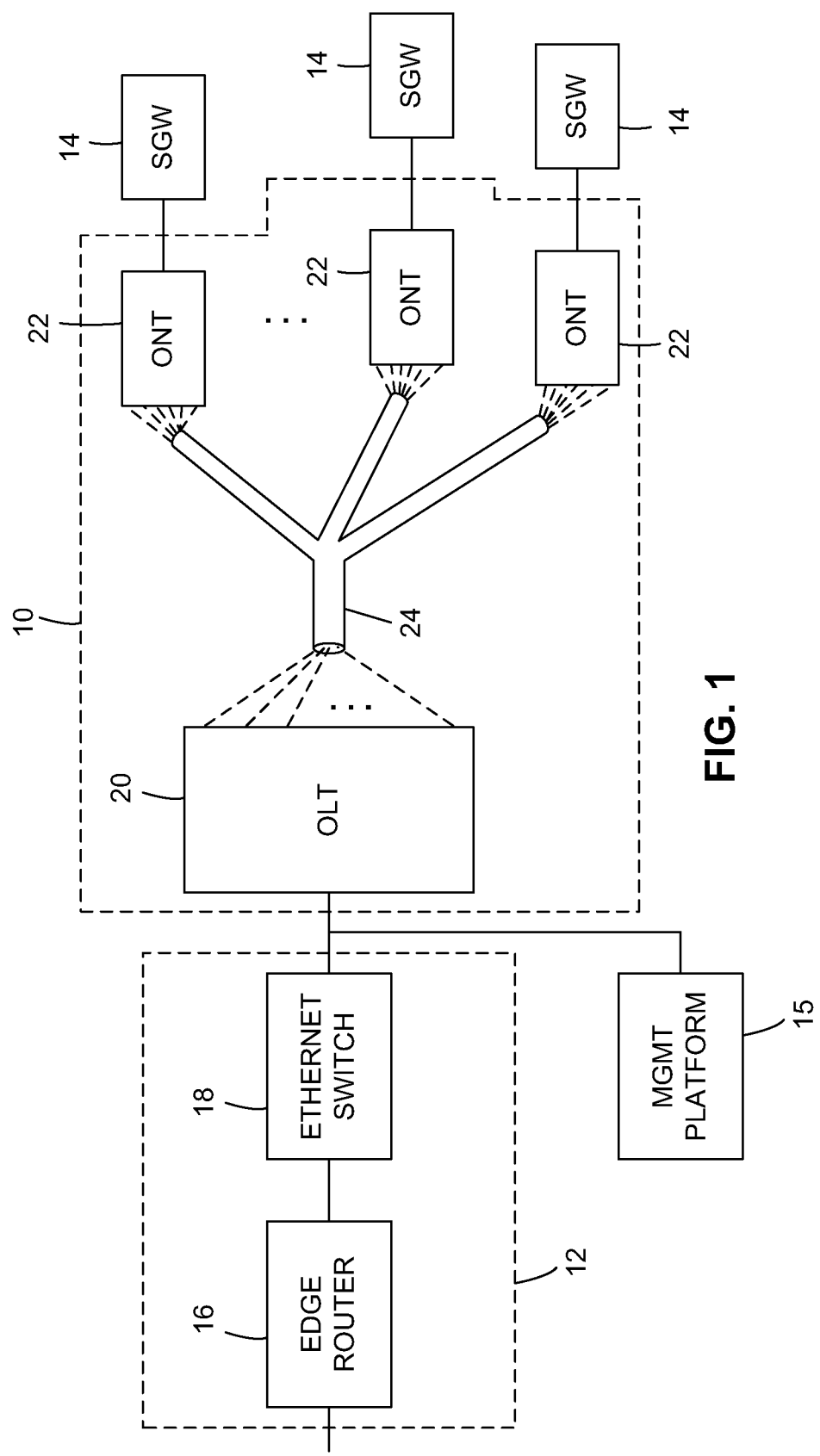
FIG. 1 is a block diagram of network in accordance with an exemplary embodiment of the present invention.

As illustrated in FIG. 1, in an exemplary embodiment of the invention, an extended data network for delivering services such as voice, video and Internet access to subscribers comprises a passive optical network (PON) 10 and an Ethernet-based aggregation network 12. As described below, elements of the network are provided with flow points, i.e., software entities, that operate generally in accordance with the IEEE 802.1ag standard, which is hereby incorporated by this reference into this patent specification ("herein"). PON 10 functions as an access network through which the subscribers access services provided by aggregation network 12. As known in the art, subscribers can connect various devices, such as local area network (LAN) routers, telephones and televisions, to Subscriber Gateways 14, located in their homes or businesses. Subscriber Gateways 14 interface such devices with PON 10 as described below, the network service provider can perform and monitor operations, administration and management (OAM) functions using a suitable management platform 15 (e.g., a computer or terminal) or other means for accessing the network.

Aggregation network 12 is of a conventional type and can include any suitable elements. For purposes of illustration, aggregation network 12 is shown as including an edge router 16 and an Ethernet (Layer-2) Switch 18, which are types of elements representative of such a conventional Ethernet-based network, but aggregation network 12 can include any other suitable elements in addition to or in place of the illustrated elements.

The PON 10 includes an Optical Line Terminal (OLT) 20 and a number of Optical Network Terminators (ONTs) 22. (The ellipsis symbol (" . . . ") is intended to indicate that, although only three ONTs 22 are shown for purposes of clarity, PON 10 can include any suitable number of additional ONTs.) The OLT 20 is optically coupled in the conventional manner with each ONT 22 by optical fibers 24 and one or more optical splitters (not separately shown for purposes of clarity). The OLT 20 can be located at, for example, an exchange or central office from which the service provider provides services such as telephone service, video entertainment and Internet access (so-called "triple-play" service). The ONTs 22 can be located at or near the residences or other premises occupied by subscribers to such services.

The communication of data on PON 10 occurs in the manner well understood in the art, using any of a number of suitable conventional technologies. For example, the PON can be a GPON, in which Ethernet frames are encapsulated in accordance with the well-known GPON Encapsulation Method (GEM). As the format of such data units and the manner in which they are communicated on a PON are generally well-known, such aspects of the PON are not described herein except as they may specifically relate to the present invention. However, it is important to note that OLT 20 communicates with ONTs 22 via PON logical ports, each identified by a unique GEM Port-ID carried in the GEM frame in which the Ethernet packet is encapsulated. This communication is conceptually indicated in FIG. 1 by the multiplicity of dashed lines at the ends of fibers 24. In a triple-play environment, the large number of PON logical ports can be used for carrying multiple instances of a multiple services to each of the ONTs 22.

Figure 2:
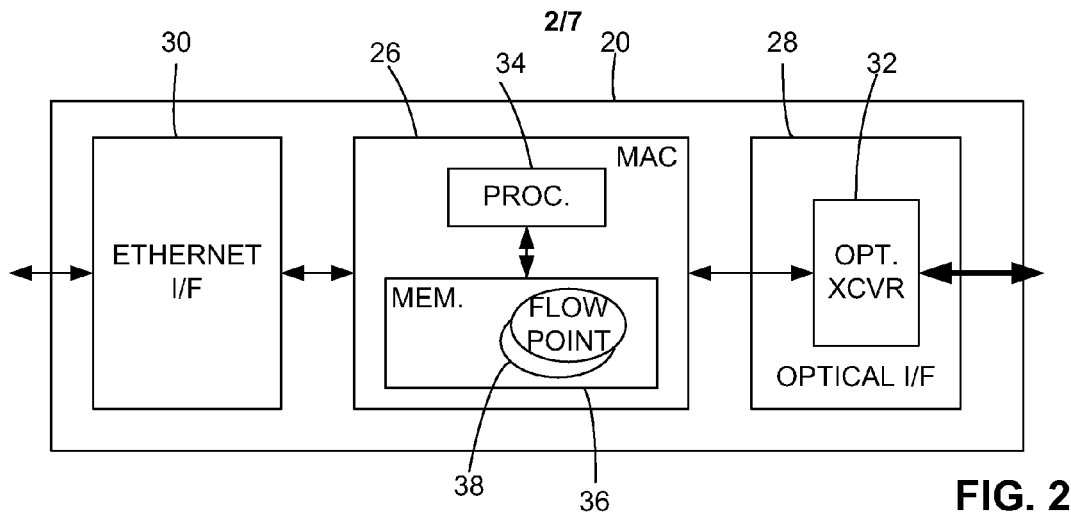
FIG. 2 is a block diagram of the Optical Line Terminal (OLT) of the network of FIG. 1.

As illustrated in FIG. 2, OLT 20 comprises a media access controller (MAC) 26, a line terminator card or other optical interface 28, and an Ethernet interface 30. Ethernet interface 30 is the physical interface between OLT 20 and aggregation network 12 (FIG. 1). Similarly, optical interface 28 is the physical interface between OLT 20 and the remaining optical portion of PON 10 (FIG. 1) and accordingly includes an opto-electronic transceiver 32 and other elements (not shown for purposes of clarity) of the type generally included in such OLT optical interfaces. As the manner in which optical interface 28 can be connected to fiber 24 (FIG. 1) and process GPON packets is well known in the art, it is not described herein. Likewise, as known in the art, MAC 26 performs the bulk of the processing required to deliver the services requested by ONTs 22. In addition to the features described below, MAC 26 can perform any suitable conventional functions and have any suitable conventional structure.

In the exemplary embodiment of the invention, MAC 26 includes a processor 34 and associated memory 36 that together define a processor system of a type in which processor 34 operates under software control. However, in other embodiments the OLT processor system can include any other suitable elements, such as programmable or hard-wired logic devices, firmware, software, application-specific integrated circuit logic, etc., in addition to or in place of the illustrated elements, that allow the processor system to be programmed or otherwise configured to perform the functions described below as well as functions performed by a conventional OLT MAC. In the illustrated embodiment, flow points 38 and other software elements are shown for purposes of illustration as conceptually stored in or residing in memory 36, with the processor system operating under control of such software elements and thus performing or causing to be performed the functions that they define. However, as persons skilled in the art to which the invention relates can appreciate, such software elements may not actually reside in memory 36 simultaneously or in their entireties; rather, portions thereof may be retrieved to memory 36 and executed on an as-needed basis in the conventional manner. The functions of flow points 38 are described below in further detail with regard to the method of operation of the system.

Figure 3:
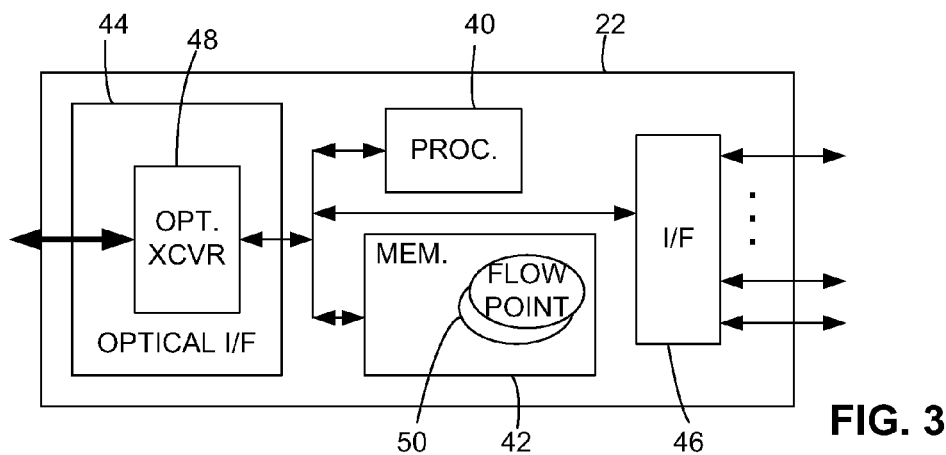
FIG. 3 is a block diagram of the Optical Network Terminator (ONT) of the network of FIG. 1.

As illustrated in FIG. 3, ONT 22 comprises a processor 40 and associated memory 42 that together define a processor system of a type in which processor 40 operates under software control. ONT 22 further comprises an optical interface 44 and a subscriber interface 46. Subscriber interface 46 is the physical interface between ONT 22 and subscriber devices such as subscriber gateway 14 (FIG. 1). Similarly, optical interface 44 is the physical interface between ONT 22 and the remaining optical portion of PON 10 (FIG. 1) and accordingly includes an opto-electronic transceiver 48 and other elements (not shown for purposes of clarity) of the type generally included in such ONT optical interfaces.

Although in the exemplary embodiment of the invention, the ONT processor system includes processor 40 and associated memory 42, in other embodiments the ONT processor system can include any other suitable elements, such as programmable or hard-wired logic devices, firmware, software, application-specific integrated circuit logic, etc., in addition to or in place of the illustrated elements, that allow the processor system to be programmed or otherwise configured to perform the functions described below. In the illustrated embodiment, flow points 50 and other software elements are shown for purposes of illustration as conceptually stored in or residing in memory 42, with the processor system operating under control of such software elements and thus performing or causing to be performed the functions that they define. However, as persons skilled in the art to which the invention relates can appreciate, such software elements may not actually reside in memory 42 simultaneously or in their entireties; rather, portions thereof may be retrieved to memory 42 and executed on an as-needed basis in the conventional manner. The functions of flow points 50 are described below in further detail with regard to the method of operation of the system.

Figure 4:
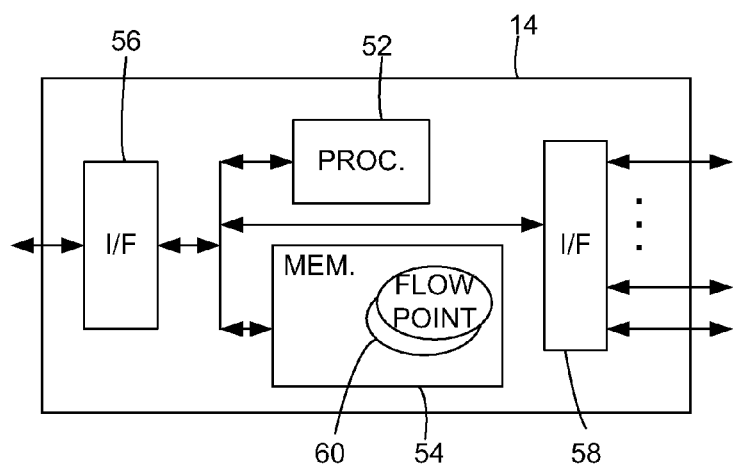
FIG. 4 is a block diagram of the Subscriber Gateway of the network of FIG. 1.

As illustrated in FIG. 4, subscriber gateway 14 comprises a processor 52 and associated memory 54 that together define a processor system of a type in which processor 52 operates under software control. Subscriber gateway 14 further comprises a gateway PON interface 56 and a gateway device interface 58. Gateway device interface 58 is the physical interface between subscriber gateway 14 and subscriber devices such as Ethernet routers (e.g., for a home network), telephones, televisions, etc. Similarly, gateway PON interface is the physical interface between subscriber gateway 14 and ONT 22 (FIG. 1). As described below, the present invention allows the logical data paths involving these QoS data paths to be individually tested.

Although in the exemplary embodiment of the invention, the ONT processor system includes processor 52 and associated memory 54, in other embodiments the subscriber gateway processor system can include any other suitable elements, such as programmable or hard-wired logic devices, firmware, software, application-specific integrated circuit logic, etc., in addition to or in place of the illustrated elements, that allow the processor system to be programmed or otherwise configured to perform the functions described below. In the illustrated embodiment, flow points 60 and other software elements are shown for purposes of illustration as conceptually stored in or residing in memory 54, with the processor system operating under control of such software elements and thus performing or causing to be performed the functions that they define. However, as persons skilled in the art to which the invention relates can appreciate, such software elements may not actually reside in memory 54 simultaneously or in their entireties; rather, portions thereof may be retrieved to memory 54 and executed on an as-needed basis in the conventional manner. The functions of flow points 60 are described below in further detail with regard to the method of operation of the system.

Figure 5:
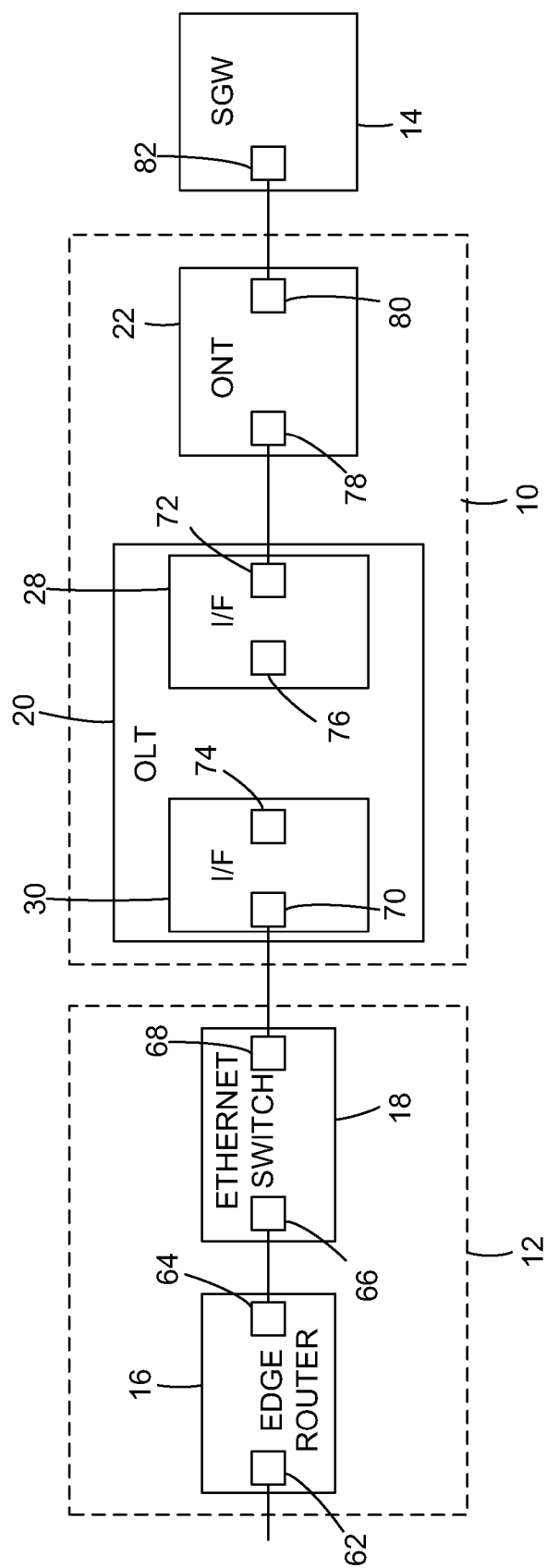
FIG. 5 is a block diagram of a portion of the network of FIG. 1, showing logical device ports in which flow points can reside.

The communication interface that a network device exposes to the external world can be modeled as a logical port. The logical port can be said to be contained in the physical interface (e.g., a circuit card), but the logical port exists in a physical or actual sense only as a manifestation of the operation of processor systems (operating under software control). For example, as illustrated in FIG. 5, the physical interfaces of edge router 16 can have logical ports 62 and 64, and the physical interfaces of Ethernet switch 18 can have logical ports 66 and 68, as known in the art. As also known in the art, the processor systems of these devices not only give rise to the logical ports but can also provide software elements that, from a logical perspective, operate within such logical ports. An example of such software elements that are known in the art to be deployable in the logical ports of Ethernet network devices are the Maintenance End Points (MEPs) and Maintenance Intermediate Points (MIPs) described in the IEEE 802.1ag standard. As noted above, MEPs and MIPs are types of flow points.

In accordance with the present invention, the processor system of OLT 20 can give rise to flow points in logical ports 70 and 72 of Ethernet interface 30 and optical interface 28, respectively. (Other logical ports 74 and 76 that may exist in OLT 20 are not used in the exemplary embodiment of the invention.) Likewise, the processor system of ONT 22 can give rise to flow points in logical ports 78 and 80 of its physical interfaces, i.e., optical interface 44 and a subscriber interface 46 (FIG. 3), respectively. Similarly, the processor system of subscriber gateway 14 can give rise to flow points in logical port 82 of gateway PON interface 56 (FIG. 4).

Figure 6:
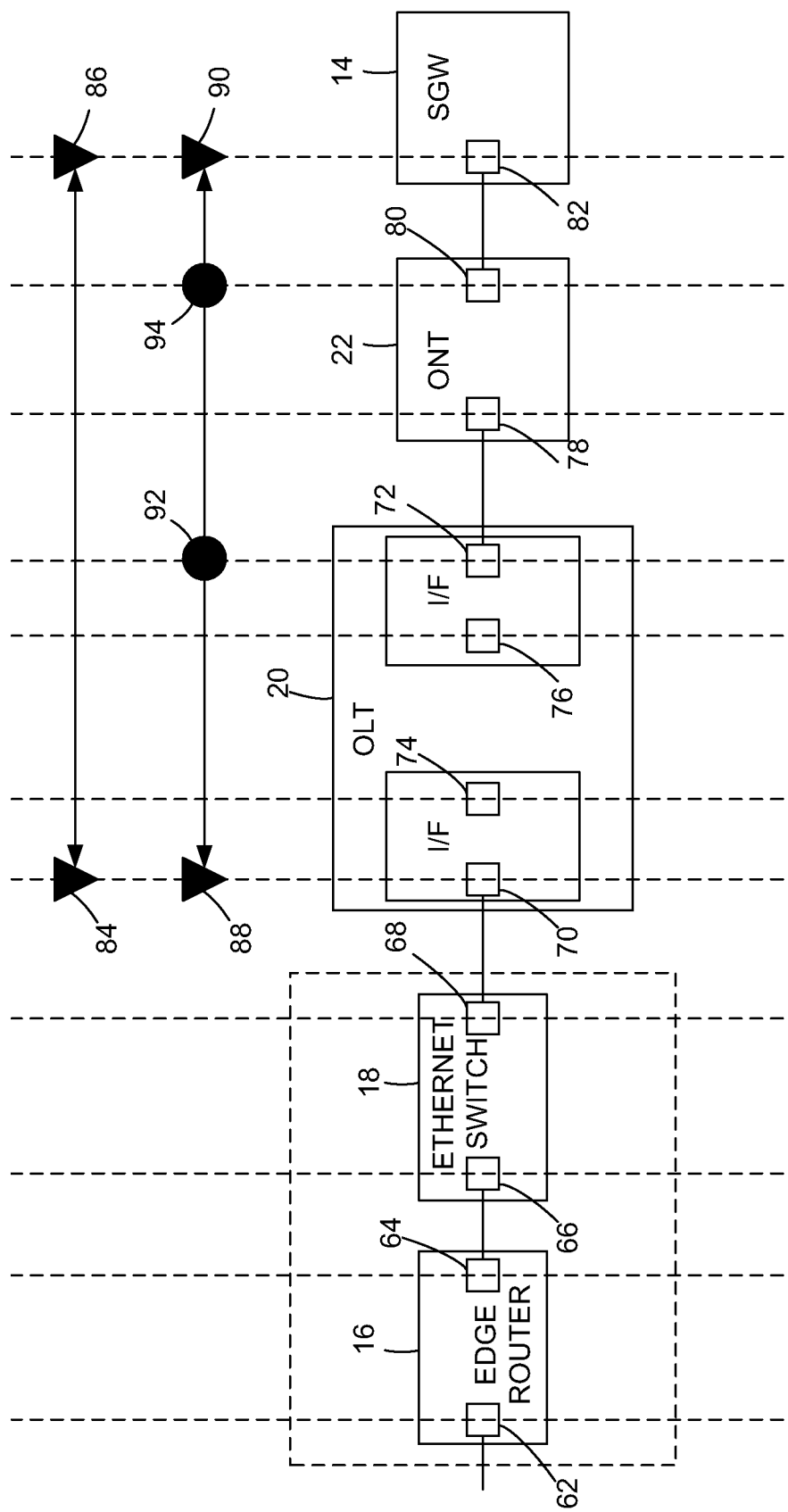
FIG. 6 is a block diagram similar to FIG. 5, showing the flow points configured in accordance with one exemplary embodiment.

As illustrated in FIG. 6, in one exemplary embodiment of the invention, a first MEP 84 and a second MEP 86 define a first Maintenance Entity (ME) level, which can be referred to for convenience as subscriber level. (In FIGS. 6-8, MEPs are represented by triangular symbols, and MIPs are represented by circular symbols, in accordance with the symbology set forth in the IEEE 802.1ag standard.) The first MEP 84 is provided in logical port 70 of OLT 20, and the second MEP 86 is provided in logical port 82 of subscriber gateway 14. In addition, or alternatively, a third MEP 88, a fourth MEP 90, a first MIP 92 and a second MIP 94 define a second ME level, which can be referred to for convenience as access link level. The third MEP 88 is provided in logical port 70 of OLT 20, and the fourth MEP 90 is provided in logical port 82 of subscriber gateway 14. The first MIP 92 is provided in logical port 72 of OLT 20, and the second MIP 94 is provided in logical port 80 of ONT 22.

The MEPs 84, 86, 88 and 90, and the MIPs 92 and 94 can operate in the manner described in the IEEE 802.1ag standard. MEPs can issue and respond to messages on their ME level, while MIPs can only respond. For example, in accordance with IEEE 802.1ag, the MEPs can periodically (e.g., in accordance with a timer) exchange Continuity Check messages (CCMs) to detect loss of continuity or incorrect network connections. As described in IEEE 802.1ag, an MEP multicasts a CCM message to each other MEP on its ME level. Also in accordance with IEEE 802.1ag, an MEP can send a Loopback message (LBM) to verify connectivity with another MEP or MIP on its ME level. Other IEEE 802.1ag messages include the Link Trace message (LTM). An MEP can multicast a LTM on its ME level to identify adjacency relationships with remote MEPs and MIPs and to aid in fault isolation. The network service provider can use management platform 15 (FIG. 1) to capture the results of the exchange of such messages among the MEPs and MIPs and display information that can indicate connectivity faults or similar undesirable states in the network. The MEPs can issue such messages periodically (e.g., at timed intervals), in response to commands received from a user via management platform 15, or in response to any other predetermined conditions. As IEEE 802.1ag, its messages, the operation of MEPs and MIPs, and the use of the information obtained from the MEPs and MIPs are well-understood by persons skilled in the art to which the invention relates, these aspects of the invention are not described in further detail herein.

Figure 7:
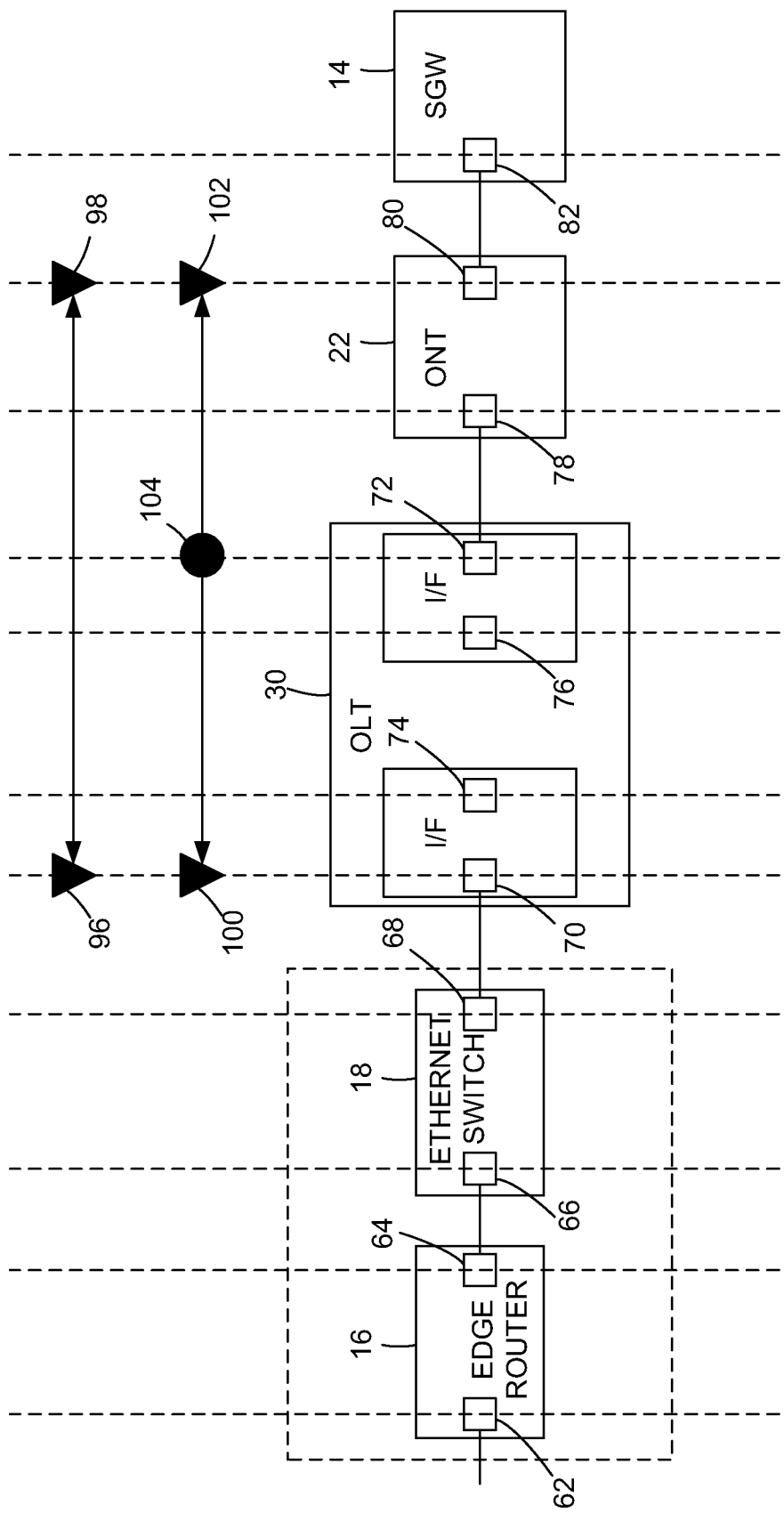
FIG. 7 is a block diagram similar to FIG. 5, showing the flow points configured in accordance with another exemplary embodiment.

As illustrated in FIG. 7, in another exemplary embodiment of the invention, a first MEP 96 and a second MEP 98 define a first (subscriber level) Maintenance Entity (ME) level. The first MEP 96 is provided in logical port 70 of OLT 20, and the second MEP 98 is provided in logical port 80 of ONT 22. In addition, or alternatively, a third MEP 100, a fourth MEP 102, and a first MIP 104 define a second (access link) ME level. The third MEP 100 is provided in logical port 70, and the fourth MEP 102 is provided in logical port 80. The first MIP 104 is provided in logical port 72 of OLT 20. The MEPs 96, 98, 100 and 102, and MIP 104 can operate and be used in the manner described above with regard to FIG. 6 and as described in the IEEE 802.1ag standard.

Figure 8:
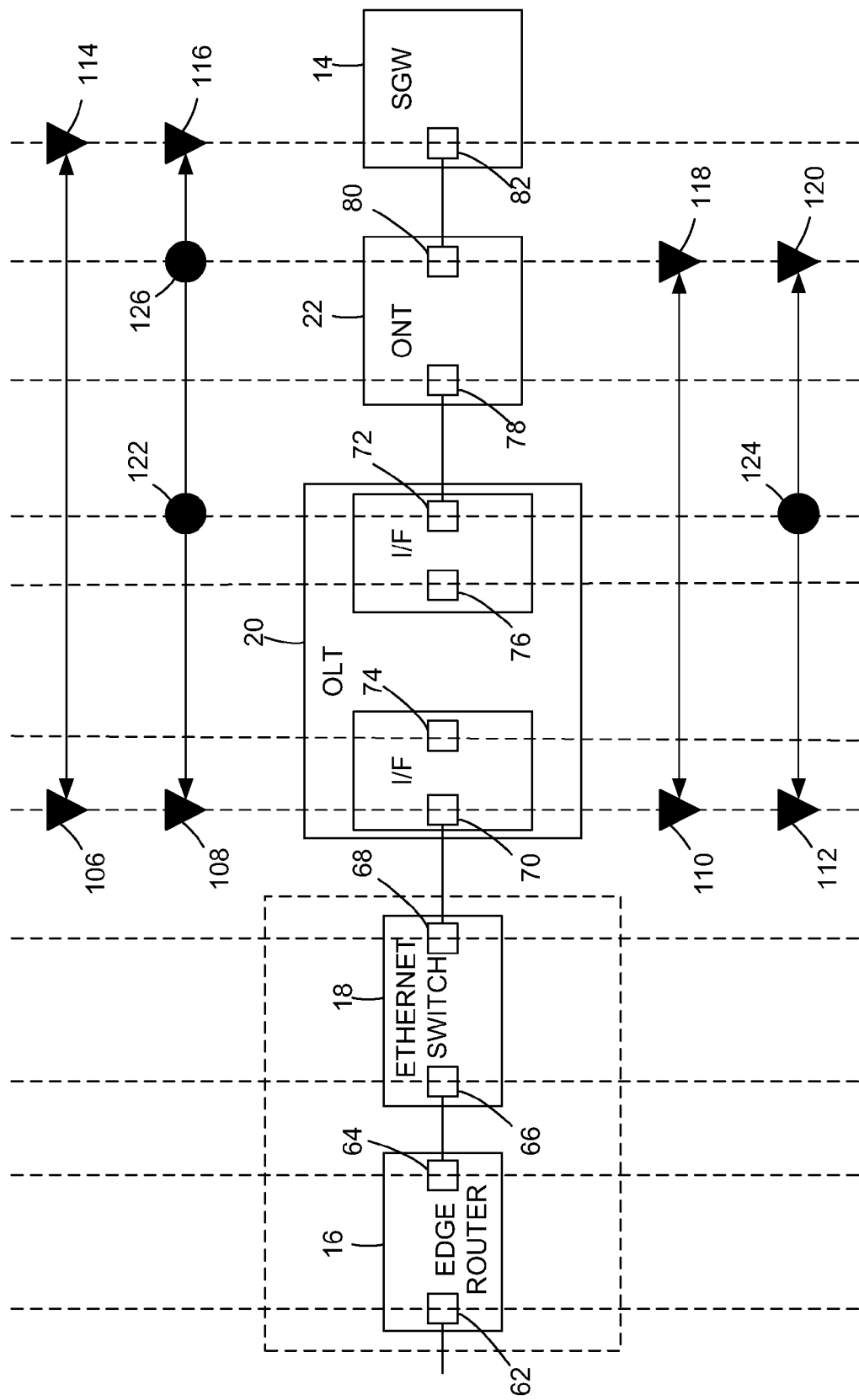
FIG. 8 is a block diagram similar to FIG. 5, showing the flow points configured in accordance with still another exemplary embodiment.

As illustrated in FIG. 8, in still another exemplary embodiment of the invention that combines the arrangements of the embodiments shown in FIGS. 6 and 7, a first MEP 106, second MEP 108, third MEP 110 and fourth MEP 112 are provided in logical port 70, a fifth MEP 114 and sixth MEP 116 are provided in logical port 82, and a seventh MEP 118 and eighth MEP 120 are provided in logical port 80. Also, a first MIP 122 and second MIP 124 are provided in logical port 72, and a third MIP 126 is provided in logical port 80. First MEP 106 and fifth MEP 114 define a first subscriber-level ME level, while second MEP 108, sixth MEP 116, first MIP 122 and third MIP 126 define a first access link-level ME level. In addition, third MEP 110 and seventh MEP 118 define a second subscriber-level ME level, while fourth MEP 112, second MIP 124 and eighth MEP 120 define a second access link-level ME level. This arrangement can operate and be used in the manner described above with regard to FIGS. 6 and 7.

Figure 9:
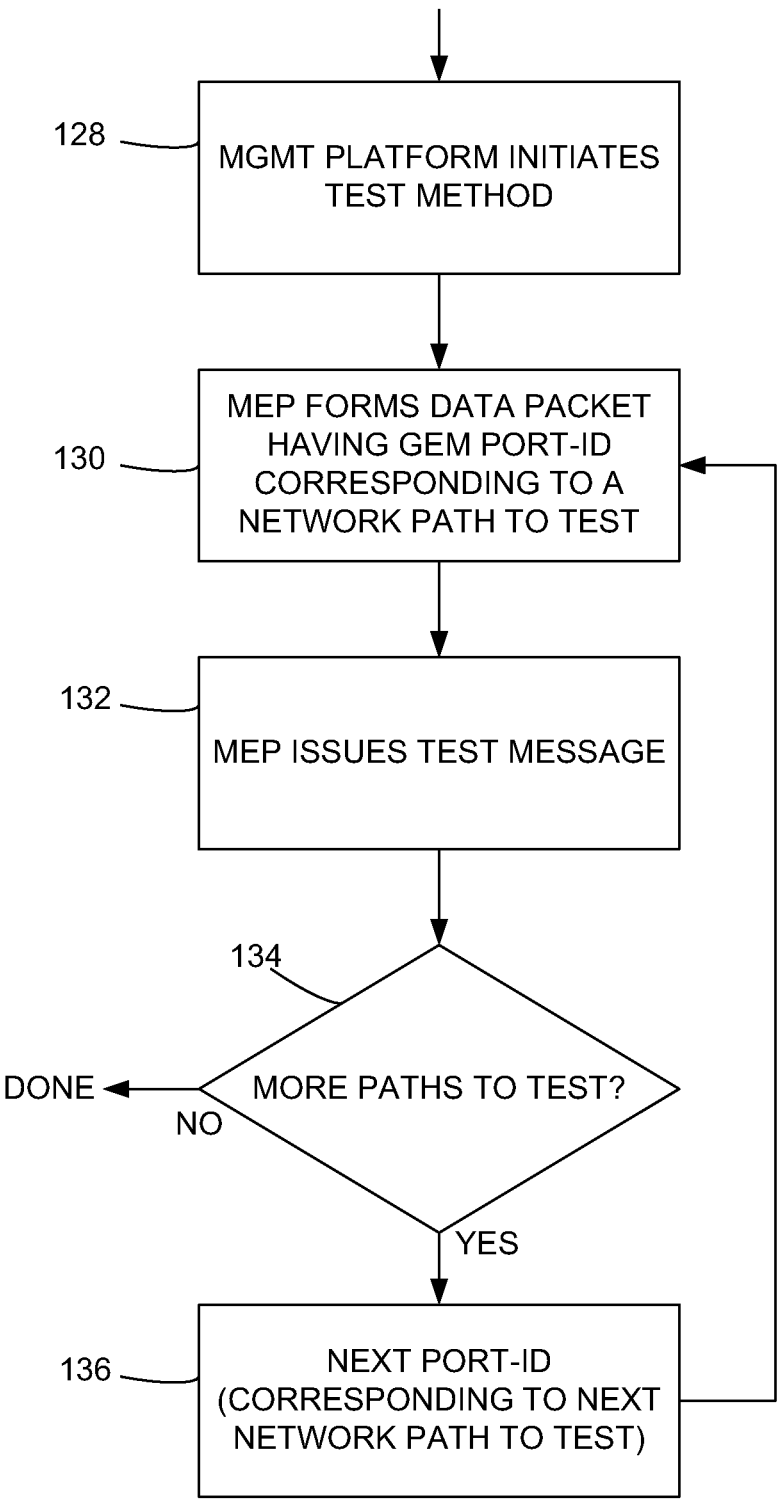
FIG. 9 is a flow diagram, illustrating a method for performing connectivity fault management in the network of FIG. 1.

One of many possible test methods using the above-described system is illustrated in FIG. 9. In this test method, the multiple PON logical data paths defined by the GEM Port-ID or other QoS indicator are individually tested. A user can initiate this test method from management platform 15 (FIG. 1), as indicated by step 128. At step 130, one or more of the MEPs responds to the initiation of the method by forming a test message. In accordance with the GPON Encapsulation Method (GEM), packets are encapsulated in GEM frames having Port-IDs. Thus, at step 130, the test message is encapsulated in a GEM frame having a first such Port-ID. At step 132, the MEP issues or transmits the encapsulated test message packets. The packets follow the PON logical data path defined by the Port-ID. Other MEPs or MIPs on the same ME level can receive and respond to these packets. The MEPs and MIPs can be configured to respond only to packets having certain predetermined Port-IDs. Such MEPs and MIPs can thus be said to be deployed in the corresponding PON logical data paths and not in other logical paths. In this manner, additional levels similar to the above-described ME levels can be defined, with only the MEPs and MIPs on those levels capable of communicating with each other.

If, as indicated by step 134, there are more PON logical data paths to test, then at step 136 another Port-ID is selected. At step 130 the test message is encapsulated in a GEM frame having that Port-ID, and at step 132 the MEP issues or transmits the encapsulated test message packets. The other MEPs and MIPs can respond to the test message in the manner described above with regard to FIGS. 6-8. The method repeats until all PON logical paths in a predetermined set have been tested. The above-described test method is merely exemplary, and other suitable test methods will occur readily to persons of skill in the art in view of the teachings herein.

It will be apparent to those skilled in the art that various modifications and variations can be made to this invention without departing from the spirit or scope of the invention. For example, although the exemplary embodiment references the IEEE 802.1ag standard, the invention can operate in accordance with any similar Connectivity Fault Management standard or scheme. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A connectivity fault management system coupled via a passive fiber network (PON) to an optical interface, the system comprising:
   a processor operable to configure a single segment of the PON, comprising an Optical Line Terminal and an Optical Network Terminator connected to a single optical interface of the PON, as:
   a plurality of subscriber levels in the same domain, each level comprising a plurality of Maintenance End Points (MEPS) and Maintenance Intermediate Points (MIPs), and each MEP within a subscriber level operable to exchange connectivity fault test messages with MEPs on the same subscriber level that are associated with corresponding PON logical data paths identified by port identifications (Port-IDs) within an exchanged connectivity fault test message and MIPs.

2. The system claimed in claim 1, further comprising an operations, administration and maintenance (OAM) platform in communication with an Optical Line terminal (OLT.

3. The system claimed in claim 1, wherein each MEP within a subscriber level is operable to exchange connectivity fault test messages with MEPs on the same subscriber level that are associated with corresponding PON logical data paths identified by port identifications (Port-IDs) within an exchanged connectivity fault test message and MIPs at periodic time intervals.

4. The system claimed in claim 1, wherein a connectivity fault test message includes a Quality-of-Service (QoS) indicator defining a corresponding PON logical data path.

5. The system claimed in claim 4, wherein one or more MEPs within a subscriber level are operable to issue a plurality of connectivity fault test messages, each having a different QoS indicator, to test connectivity of each corresponding PON logical data path.

6. The system as in claim 1 wherein the connectivity fault test messages comprise continuity check messages, loopback messages or link trace messages.

* * * * *